Figure 1:
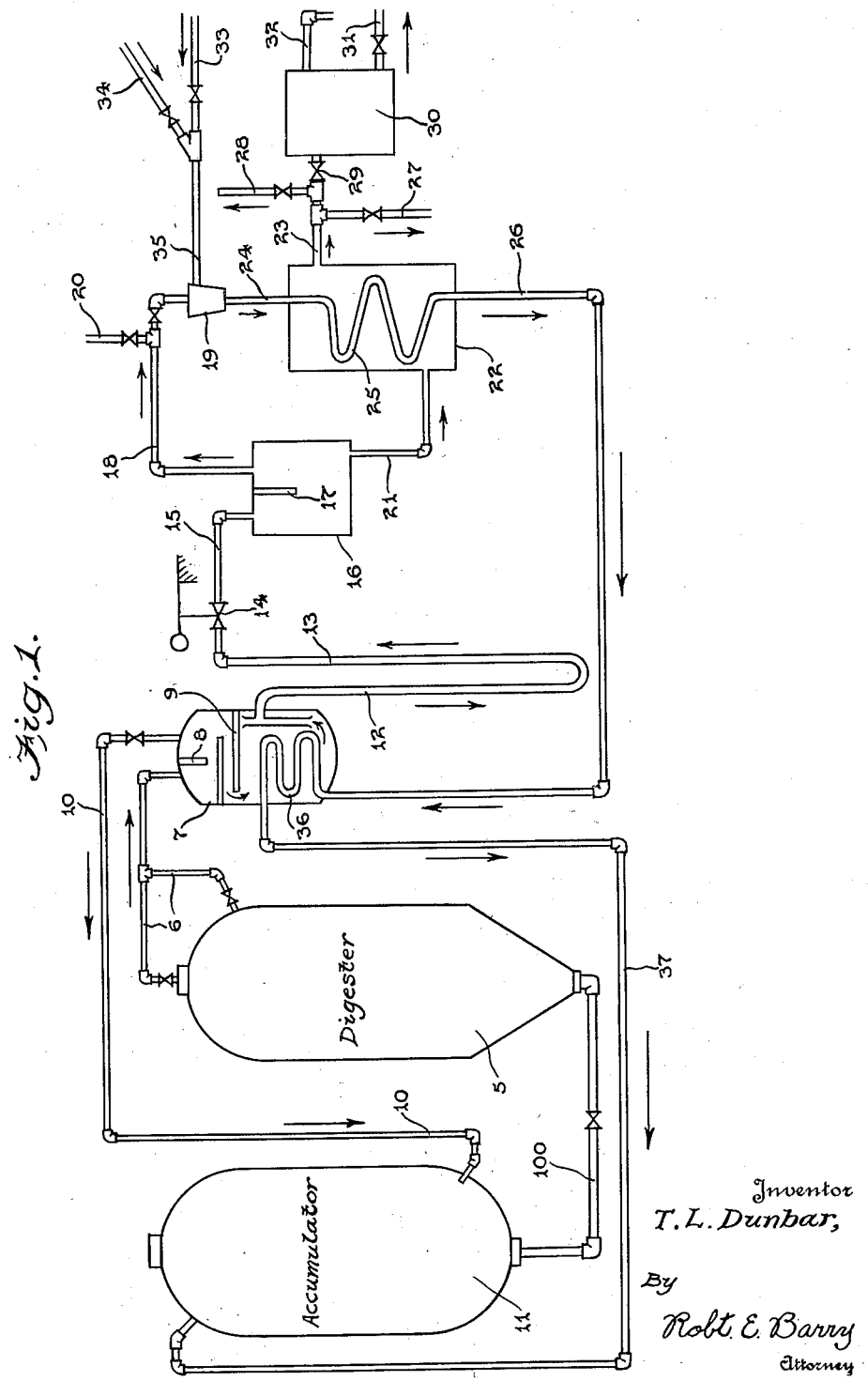

Nov. 17, 1931.    T. L. DUNBAR    1,832,367
PROCESS AND APPARATUS FOR PRECONDITIONING COOKING SOLUTIONS
Filed May 17, 1930    3 Sheets-Sheet 1

Inventor
T. L. Dunbar,
By
Robt. E. Barry
Attorney

Nov. 17, 1931. T. L. DUNBAR 1,832,367
PROCESS AND APPARATUS FOR PRECONDITIONING COOKING SOLUTIONS
Filed May 17, 1930 3 Sheets-Sheet 2

Inventor
T. L. Dunbar,
By
Robt. E. Barry
Attorney

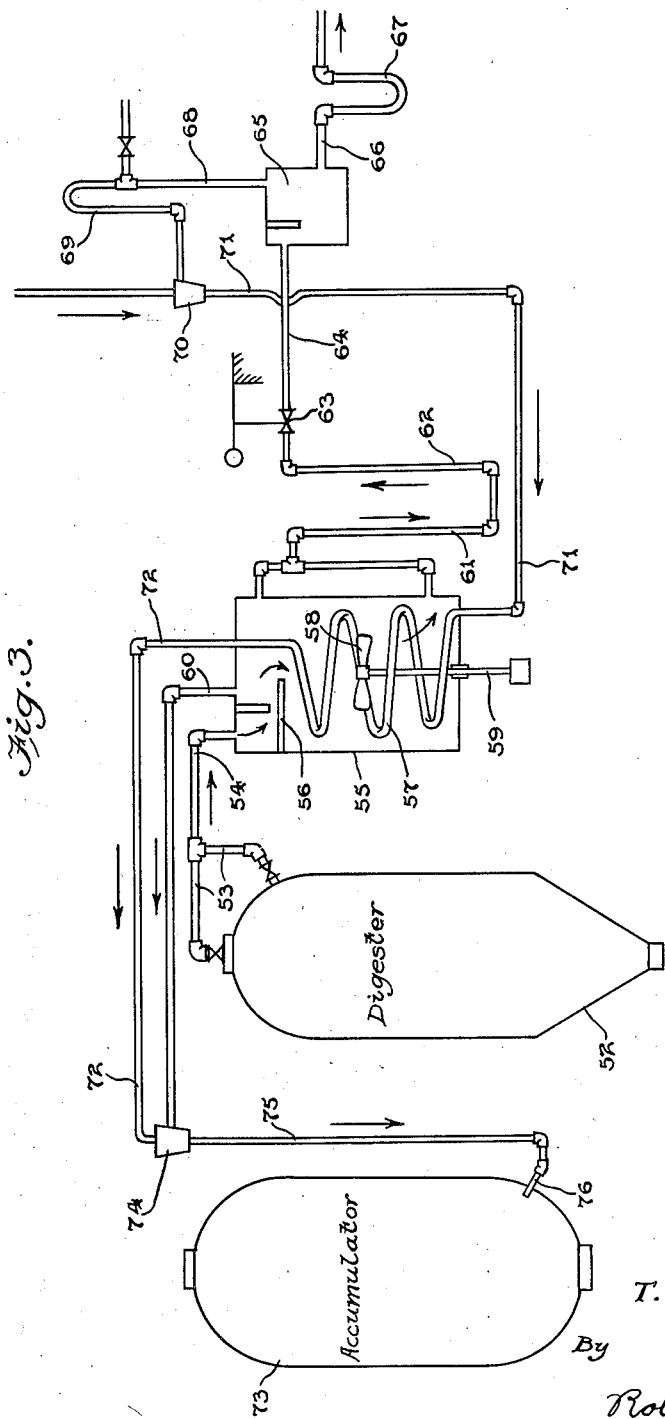

Patented Nov. 17, 1931

1,832,367

UNITED STATES PATENT OFFICE

THOMAS L. DUNBAR, OF WATERTOWN, NEW YORK

PROCESS AND APPARATUS FOR PRECONDITIONING COOKING SOLUTIONS

Application filed May 17, 1930. Serial No. 453,256.

This invention pertains to the production of fibrous pulp, and one of the salient objects of the invention is to provide a novel process and apparatus devised for the conservation of heat and the recovery of $SO_2$ or other gases, in the digestion of fibrous material for pulp making purposes.

In accordance with the invention, improved means are employed to save heat units, by transferring the same from liquor which is relieved from cooking vessels or digesters previous to the discharge of the main body of pulp therefrom, to cold fresh cooking solution or acid liquor, by the use of conventional heat exchange means, while concurrently and separately mixing gases relieved from the digesters with fresh cooking solution within a closed vessel or system, thereby recovering the heat units as well as the gases.

In some existing processes, both the gases and liquids relieved from a digester are passed into another digester, and in the latter, they are mixed with the new charge of raw vegetable matter and cooking solution. In other processes, both the relief gases and liquids are passed into a body of fresh cooking solution under pressure, and the last mentioned solution is usually contained in a closed vessel, commonly called an accumulator. For certain purposes, it is undesirable to so mix the relieved liquid portion directly with the fresh cooking solution, or to mix it with a new charge of vegetable matter to be cooked. To meet such a contingency, I have invented an improved process and apparatus, and in accordance with the invention, I provide means to separate the relieved liquid from the relieved gas, and then utilize heat units derived from the liquid portion of the relieved mixture to preheat a portion of the fresh cold cooking solution by indirect heat exchange. This heat transference is facilitated by applying the heat units to the fresh cooking solution at a period in its preparation, when it is initially cool, and not previously heated to any great extent, and at the same time the relief liquid is cooled down to the point where it can advantageously be employed, I cause the gaseous portion which has been separated from the relieved mixture, to be absorbed, by introducing said gaseous portion directly into fresh cooking solution in a separate vessel, in which the gas is absorbed under superatmospheric pressure.

A further object of the invention is to relieve gases and liquids from a digester, and to separate the relieved mixture into liquid and gaseous fractions; the liquid fraction or fractions being employed to indirectly heat fresh acid liquor, and the latter being employed to absorb the gaseous fraction or fractions.

With the foregoing objects outlined and with other objects in view which will appear as the description proceeds, the invention consists in the novel features hereinafter described in detail, illustrated in the accompanying drawings, and more particularly pointed out in the appended claims.

Figure 2:
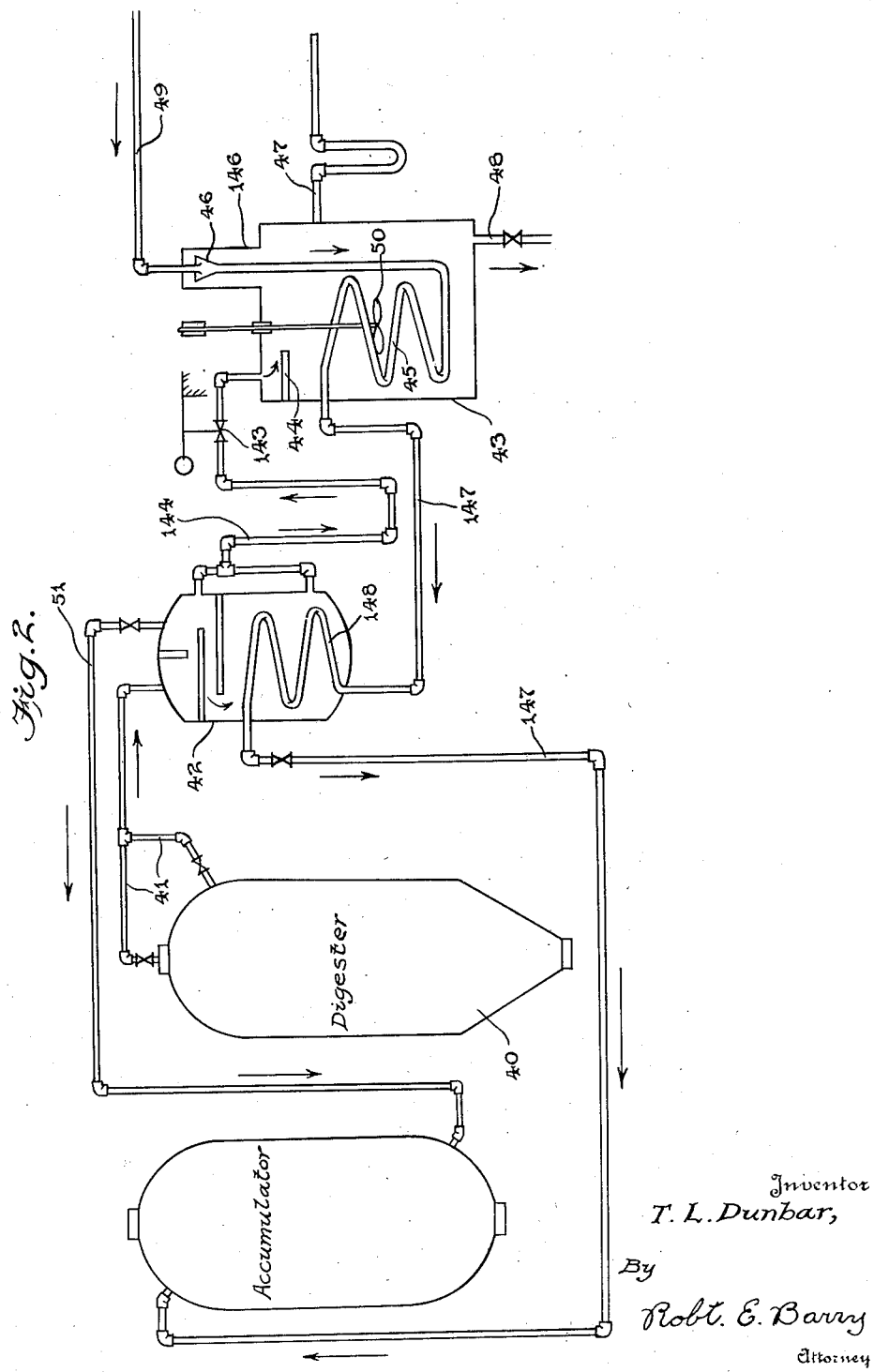

In the drawings,

Figs. 1, 2 and 3 are side elevations respectively of three embodiments of novel apparatus which I have invented for use in carrying out my improved process.

Referring first to Fig. 1, it will be observed that 5 is a digester, 11 a pressure accumulator, 7 a combined heat exchanger and separator, 16 a separator, 22 a heat exchanger, and 30 a receiver.

When practicing the process with the apparatus shown in Fig. 1, chemical gases, vapors and liquids are relieved from the top of a digester, through the pipes 6, from which they flow into the separator 7. Vertical and horizontal baffles 8 and 9 are arranged within the closed separator to assist in separating the gaseous portion of the relieved mixture from the liquid portion thereof, and the gaseous portion thus separated passes off by way of the valved pipe 10, into the lower portion of the accumulator which contains fresh acid liquor that is used to absorb the gas.

Heat units of the liquid portion of the relief mixture are transferred from the liquid in the separator, to the heat exchange coil 36, through which fresh chemical liquor passes on its way to the accumulator, and after the liquid portion of the relief mixture has been deprived of heat units in this way, it flows from the separator, through a U-shaped trap pipe or liquid seal comprising the arms 12 and 13, the latter of which is joined by a pressure operated valve 14 to a pipe 15. The valve 14 is set to hold a pressure in the separator 7, so that the separation in this vessel takes place under pressure. The element 14 may be a pressure actuated relief valve of any suitable form, for maintaining a pressure of a suitable magnitude in pipes 13 and 12, and in vessel 7, while allowing a lower or substantially atmospheric pressure to be maintained in the pipe 15 and separator 16, through which the relief liquor may subsequently pass. Thus, the separator 16 acts as a flash chamber, wherein a portion of the absorbed gas releases from the liquid, owing to the reduction of pressure. The flash chamber is preferably equipped with suitable baffling means 17 to facilitate the further separation of gas from the relief liquid, this gas passing upward through the pipe 18, from which it may flow into a mixer 19, or from which it may enter a valved pipe 20, which may lead the same to atmosphere or to a part of the acid preparation plant, in case it is desired to absorb this gas in cool acid at any earlier stage in the process of acid preparation.

The liquid portion of the relief liquor from the separator 16, passes by means of pipe 21, into the casing of the heat exchanger 22, and from the latter, it is discharged through a pipe 23.

The cold acid liquor is fed from the mixer 19, through a pipe 24 that is connected to a coil 25 arranged within the heat exchanger. Of course, this coil is of suitable heat conducting material, so that the fresh acid liquor is somewhat heated by the relief liquid flowing through the casing 22. The fresh liquor thus preheated, passes by way of a pipe 26 to the coil 36, and from the latter, the now more highly heated liquor flows through a pipe 37, into the accumulator 11, wherein it acts to absorb the gaseous fraction of the relief liquid which enters by way of pipe 10.

The cooled relief liquor leaving through the pipe 23, may be diverted to waste, through valved pipe 27, or may be returned to the liquor preparation plant through pipe 28, or it may be conducted through a valve pipe 29 to a storage vessel 30, from which it may be drawn as desired through valved pipe 31. The vessel 30 is preferably provided with an overflow pipe 32 for passing excess liquor to waste.

The fresh cooking solution entering the apparatus is pumped from the solution making section of the plant, through the pipe 33, or from storage through the pipe 34, into a pipe 35 which discharges into the mixer 19. In the latter, the fresh liquor absorbs gas coming from the flash chamber 16.

From the above it may be seen that the relieved liquor from the vessels 7 and 22 imparts its heat units indirectly to the fresh cooking solution, while the latter is on its way to the accumulator, and that some of the gas of the relief liquor passes from one of these vessels through the pipe 10, into the accumulator, while the remainder may flow through the pipe 18 to be mixed in 19 with fresh cooking solution at the time the latter enters my apparatus.

In the embodiment of the invention shown in Fig. 2, the process is in all essentials similar to that described in connection with Fig. 1, but the apparatus is of somewhat simpler construction. In this form of the apparatus, 40 designates a digester having valved relief pipes 41 leading into a separator and heat exchanger 42. From this closed separator, which also has internal baffles, the relief gas passes by way of pipe 51, into the cooking solution in the accumulator.

In this arrangement, the difference lies in combining in one vessel 43, the functions of the parts 16, 22 and 30 of Fig. 1, with their dependent accessories. Thus, vessel 43 serves as a storage tank for separated relief liquor under a lower pressure than exists in the separator 42, due to the use of the pressure operated valve 143 which is interposed in the pipe line 144, leading from 42 to 43. Vessel 43 also acts as a secondary separator or flash chamber having suitable internal baffling means 44 to aid the separation of gas from the liquid. Furthermore, the vessel 43 and the coil 44 arranged therein, functions as a heat exchanger corresponding to the first heat exchanger in Fig. 1.

In this form of the invention, the fresh cooking solution enters the apparatus through the pipe 49, from which it flows into a mixer 46. The latter is placed in a rising extension 146 of the vessel 43, so that gas separated from the relief mixture in said vessel, will flow upwardly and into the mixer to be thoroughly commingled with the fresh cooking solution, and to be absorbed thereby as the latter flows on and into the heat exchange coil 45. The outlet of this coil is joined by a pipe 147 to a heat exchanging coil 148, positioned in the tank 42, and the outlet from this coil is connected by a pipe 149 to the accumulator.

The vessel 43 has a valved discharge line for leading relief liquor either to waste, or to the cooking solution preparation plant, and a trapped overflow pipe 47 for the vessel 43 prevents the complete filling of the tank with liquid, thus insuring sufficient space within the upper portion of the tank for the separation of the gas from the liquid.

For the purpose of agitating the liquid in the vessel 43 to facilitate heat exchange and the freeing of absorbed gases, the vessel 43 may have an agitator 50, driven by any suitable means from the exterior of the vessel.

In the modification illustrated in Fig. 3, the gases, vapors and liquids resulting from the cooking in the digester 52, are discharged through the valved branches 53, into a conduit 54 that conducts the same into the top of a pressure separator 55 which contains any suitable baffling means 56 to assist in the separation of the gases from the liquids.

A heat exchanging coil 57, through which the fresh cooking solution passes, is arranged in the separator, and located within the annulus formed by the convolutions of the coil, is an agitator 58, which functions in the same manner as the agitator 50 in Fig. 2. In Fig. 3, the agitator is mounted on an upstanding shaft 59 that is driven by any suitable means from the exterior of the separator.

The gases separated from the relief mixture, are discharged from the top of the vessel 55, by way of the pipe 60 which leads to a mixer 74.

The liquid fraction from the separator flows through a U-shaped trap pipe having arms 61 and 62, into a pressure operated valve 63 which functions to maintain the separator 55 under super-atmospheric pressure.

From the valve, the liquid flows through a conduit 64, into a flash separator 65, and from the latter, the liquid fraction is discharged through a pipe 66 having a trap portion 67. The liquid leaving the pipe 66 may be conducted to waste, or may be returned to the cooking solution preparation system.

The vessel 65 is under a lower pressure than the vessel 55, so that gases are evolved in the sparator 65, and these gases pass upward through a pipe 68 to a suitable height, and thence are led by a pipe 69 into a gas mixer 70, through which the cold cooking solution is pumped on its way to the accumulator 73. In the mixer, the gas is absorbed by the fresh cold cooking solution entering either from storage or directly from the preparation plant. The mixed solution from mixer 70 flows by way of pipe 71, into the coil 57, and as it flows through the latter, it is heated by the hot relief liquid in the vessel 55, and from the coil, the substantially fresh preheated cooking solution flows through a conduit 72, into the mixer 74, where it meets the hot gases from the pipe 60. These gases act to further heat the cooking solution, and the latter functions to absorb these gases, and the combined mixture flows from the mixer through a discharge pipe 75 that leads to a valved branch 76 which empties into the accumulator.

I desire to be understood that while I have illustrated only one digester for each embodiment of the invention, that any number of digesters may be employed with my invention, and that such digesters, as well as the accumulators, are maintained under super-atmospheric pressure.

It will also be understood that the fresh cooking solution, preconditioned and preheated in accordance with the invention, is to be fed from the accumulator to any one of the digesters after the latter has been charged with fibrous material, and at the beginning of the cooking operation. For example, as shown in Fig. 1, the hot liquor from the accumulator may flow or be pumped through a valved pipe 100, to any one of the digesters.

It will be observed from the above description, that in my invention, the liquid portion of the relief mixture is separated from the gaseous portion, so that the liquid portion does not directly enter the new cooking solution, and yet, the latter extracts heat units from the liquid portion of the relief, by means of the heat exchanger or heat exchangers, which prevents the commingling of the two liquids. Furthermore, by the use of heat exchangers, the liquid fraction or fractions of the relief mixture is made relatively cool before admixing the same with the fresh cooking solution, and before the latter enters the pressure accumulator.

By arranging a deep hydrostatic sealing leg or U tube on the exit side of the pressure separator, and locating a pressure actuated relief valve posterior to the U tube, I obtain the following result. Assuming that the relief valve 14 (143, 63), is set to pop at 25 lbs. gauge pressure, and the vertical distance from the bottom of the U tube to the level of the liquid in the pressure separator is 46 feet (equivalent to a static pressure of approximately 20 lbs.), then the valve 14 will allow the escape of liquid at 25 lbs. pressure, if the liquid in the pressure separator is up to the maximum height, (at which level also the relief valve 14 may be situated). When, however, the pressure in the separator 7, for example, is in excess of 25 lbs., the valve will still pass liquid without passing gas, as the liquid will lower in the descending leg 12, and the pressure separator 7 will remain sealed until a pressure of 45 lbs. is reached therein. Thus, it may be seen that the use of the hydraulic leg or seal, avoids the necessity of precision in the setting of the relief valve 14, for instance, and permits a wide variation in pressure within the separator 7, without allowing gas to escape through the relief valve 14.

While I have disclosed what I now consider to be preferred embodiments of the invention in such manner that the same may be readily understood by those skilled in the art, I am aware that changes may be made in the details disclosed, without departing from the spirit of the invention, as expressed in the claims.

What I claim and desire to secure by Letters Patent is:

1. In the digestion of fibrous material, releasing relief fluid from a digester during a cooking operation, separating the relief fluid into a gaseous fraction and a liquid fraction, and flowing relatively cold fresh cooking solution in heat exchange relation with the liquid fraction while maintaining such fresh cooking solution out of contact with the liquid fraction.

2. In the digestion of fibrous material, releasing relief fluid from a digester during a cooking operation, separating the relief fluid into a gaseous fraction and a liquid fraction, passing relatively cold fresh cooking solution through the liquid fraction while maintaining such fresh cooking solution out of contact with the liquid fraction, and commingling the gaseous fraction with the fresh cooking solution after the latter has been passed through the liquid fraction.

3. In the digestion of fibrous material, releasing relief fluid from a digester during a cooking operation, separating the relief fluid into a gaseous fraction and a liquid fraction, passing relatively cold fresh cooking solution through the liquid fraction while maintaining such fresh cooking solution out of contact with the liquid fraction, feeding the fresh cooking solution after passing through the liquid fraction, into a pressure accumulator, and mixing the gaseous fraction with the fresh cooking solution after the latter has passed through the liquid fraction.

4. In the digestion of fibrous material, releasing relief fluid from a digester during the cooking period, and introducing the same into a pressure chamber where the liquid fraction of the relief mixture separates from the gaseous fraction thereof, and passing fresh cooking solution through the liquid fraction by indirect heat exchange while the liquid fraction is in said chamber and while it is still hot.

5. A process as claimed in claim 4, in which the gaseous fraction from the pressure chamber, while still hot, is introduced into the fresh cooking solution after the latter has passed through the liquid fraction.

6. A process as claimed in claim 4, in which the fresh cooking solution, after passing through the liquid fraction, is introduced into a pressure accumulator chamber, and commingling the gaseous fraction while still hot, with the fresh cooking solution after the latter has passed through the liquid fraction.

7. A process as claimed in claim 4, in which the liquid fraction passes through the pressure chamber and then has its pressure released, whereby a secondary gaseous fraction is produced, and mixing the secondary gaseous fraction with the fresh cooking solution before the latter has passed through the liquid fraction.

8. In the digestion of fibrous material, releasing fluid mixture from a digester during the cooking period, introducing the mixture into a closed pressure separator maintained under pressure, separating said mixture in the chamber into a gaseous fraction and a liquid fraction, discharging a portion of the liquid fraction from said chamber, releasing the pressure on the relief fraction discharged from the chamber, and introducing the same into a flash separating means, feeding fresh cooking solution through a passageway which extends through the pressure separator and the flash separating means, transferring heat units from the liquid fraction to the fresh cooking solution as it flows through said passageway, and mixing a secondary gaseous fraction of the relief mixture from the flash separating means with the cooking solution flowing through said passageway.

9. A process as claimed in claim 8, in which the gaseous fraction from the pressure separator is introduced into the fresh cooking solution after the latter has passed through said pressure separator.

10. A process as claimed in claim 8, in which the liquid fraction in one of said separators is agitated to facilitate heat exchange with the fresh cooking solution flowing through the passageway.

11. A process of preheating and preconditioning cooking liquor to be used in the digestion of fibrous material, comprising discharging relief fluid from a digester into a separator chamber maintained under superatmospheric pressure, separating the relief fluid in said chamber into a gaseous fraction and a liquid fraction, passing fresh cooking solution through the liquid fraction while maintaining the same out of contact with said liquid fraction, and thereby transferring heat units from the liquid fraction to the fresh cooking solution, discharging the gaseous fraction from the separator chamber and introducing the same into the cooking solution after the latter has passed through the liquid fraction, and thereby transferring heat units from the gaseous fraction to the cooking solution and absorbing the gaseous fraction in the cooking solution, discharging the liquid fraction from the separator chamber through a hydraulic seal, and then releasing the pressure on the liquid fraction.

12. A process as claimed in claim 11, in which the released liquid fraction after its pressure has been reduced, is introduced into a flash separator, separating from the liquid fraction in the flash separator, a secondary gaseous fraction, and mixing the secondary gaseous fraction with the fresh cooking solution before the latter passes through the liquid fraction in the pressure separating chamber.

13. An apparatus of the character described, comprising a digester, an accumulator, a separator, means for leading relief fluid from the digester to the separator, a fresh cooking solution passageway leading to the accumulator and having a heat exchange portion arranged in the separator, and a conduit for discharging a gaseous relief fraction from the separator and for introducing the same into the fresh cooking solution.

14. An apparatus of the character described, comprising a digester, a separator, means for passing relief fluid from the digester to the separator, a heat exchange coil arranged in the separator, an accumulator, a conduit leading from the outlet of the coil to the accumulator, means for introducing fresh cooking solution into the inlet of the coil, means for discharging a gaseous relief fraction from the separator and introducing the same into fresh cooking solution after the latter has passed through said coil, a trap pipe for discharging a liquid relief fraction from the separator, and a pressure operated valve connected to the last mentioned pipe for maintaining pressure within the separator.

15. An apparatus of the character described, comprising a digester, a separator, means for passing relief fluid from the digester to the separator, a heat exchange coil arranged in the separator, an accumulator, a conduit leading from the outlet of the coil to the accumulator, means for introducing fresh cooking solution into the inlet of the coil, means for discharging a gaseous relief fraction from the separator and introducing the same into fresh cooking solution after the latter has passed through said coil, a trap pipe for discharging a liquid relief fraction from the separator, and a pressure operated valve connected to the last mentioned pipe for maintaining pressure within the separator, said valve being arranged posterior to the trap in the pipe.

16. An apparatus of the character described, comprising a digester, means for discharging relief fluid from the digester, a separator into which said means discharges, an accumulator, a fresh cooking solution passageway leading to the accumulator and having a heat exchange portion arranged within the separator, means for discharging a gaseous relief fraction from the separator, and for introducing the same into the fresh cooking solution after the latter has passed through said separator, a U-shaped trap pipe having its inlet end connected to the separator for discharging a liquid relief fraction from the separator, and a pressure operated valve arranged on the outlet end of said pipe.

17. An apparatus as claimed in claim 16, including means for leading the liquid fraction from said valve to a flash separator maintained at substantially atmospheric pressure, and means for feeding a gaseous relief fraction from the flash separator into the fresh acid solution passageway anterior to the heat exchange portion of the same.

18. An apparatus of the character described, comprising a digester, a pressure separator, means for leading relief fluid from the digester into the separator, a pressure accumulator, a fresh cooking solution passageway leading to the accumulator and having a heat exchange portion arranged within the separator, means for discharging a gaseous relief fraction from the separator and introducing the same into the fresh cooking solution after the latter has passed through the separator, a liquid relief fraction conduit leading from the separator, a pressure operated valve interposed in said conduit for maintaining the separator under super-atmospheric pressure, a flash separator into which said conduit discharges, means for feeding a gaseous relief fraction from the flash separator into the cooking solution passageway anterior to the heat exchange portion of the same, and a second heat exchange portion for said passageway heated by relief liquid of the flash separator.

19. An apparatus of the character described, comprising a digester, a pressure separator, means for leading relief fluid from the digester into the separator, a pressure accumulator, a fresh cooking solution passageway leading to the accumulator and having a heat exchange portion arranged within the separator, means for discharging a gaseous relief fraction from the separator and for introducing the same into the fresh cooking solution after the latter has passed through the separator, a liquid relief fraction conduit leading from the separator, a pressure operated valve interposed in said conduit for maintaining the separator under super-atmospheric pressure, a flash separator into which said conduit discharges, means for feeding a gaseous relief fraction from the flash separator into the cooking solution passageway anterior to the heat exchange portion of the same, a second heat exchange portion for said passageway heated by relief liquid of the flash separator, and an agitator arranged in one of said separators.

In testimony whereof, I have hereto affixed my signature.

THOMAS L. DUNBAR.